US012585682B2

(12) United States Patent
Mallick et al.

(10) Patent No.: US 12,585,682 B2
(45) Date of Patent: Mar. 24, 2026

(54) METHOD AND SYSTEM FOR GENERATING LONGFORM TECHNICAL QUESTION AND ANSWER DATASET

(71) Applicant: Tata Consultancy Services Limited, Mumbai (IN)

(72) Inventors: Prabir Mallick, Kolkata (IN); Samiran Pal, Kolkata (IN); Avinash Kumar Singh, Pune (IN); Anumita Dasgupta, Kolkata (IN); Soham Datta, Kolkata (IN); Kaamraan Khan, Hyderabad (IN); Tapas Nayak, Kolkata (IN); Indrajit Bhattacharya, Kolkata (IN); Girish Keshav Palshikar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 4 days.

(21) Appl. No.: 18/479,646

(22) Filed: Oct. 2, 2023

(65) Prior Publication Data

US 2024/0119075 A1      Apr. 11, 2024

(30) Foreign Application Priority Data

Oct. 10, 2022    (IN) ............................. 202221057973

(51) Int. Cl.
*G06F 16/3329* (2025.01)
*G06F 16/334* (2025.01)
(Continued)

(52) U.S. Cl.
CPC ...... *G06F 16/3329* (2019.01); *G06F 16/3344* (2019.01); *G06F 40/186* (2020.01); *G06F 40/284* (2020.01); *G06F 40/40* (2020.01)

(58) Field of Classification Search
CPC ............. G06F 16/3329; G06F 16/3344; G06F 40/284; G06F 40/40; G06F 40/20; G06F 40/30; G06F 40/186
See application file for complete search history.

(56) References Cited

U.S. PATENT DOCUMENTS

| | | | |
|---|---|---|---|
| 2002/0010707 A1* | 1/2002 | Chang ................... | G06F 40/103 715/205 |
| 2011/0123967 A1* | 5/2011 | Perronnin ............ | G09B 17/003 434/362 |

(Continued)

OTHER PUBLICATIONS

Wing, Weiming et al., "Automatic Question Generation for Learning Evaluation in Medicine", Date: Aug. 2007, Publisher:Springer, Link: https://link.springer.com/content/pdf/10.1007/978-3-540-78139-4_22.pdf.

(Continued)

*Primary Examiner* — Vaishali Shah
(74) *Attorney, Agent, or Firm* — Finnegan, Henderson, Farabow, Garrett & Dunner, LLP

(57) ABSTRACT

Conventional Question and Answer (QA) datasets are created for generating factoid questions only and the present disclosure generates longform technical QA dataset from textbooks. Initially, the system receives a technical textbook document and extracts a plurality of contexts. Further, a first plurality of questions are generated based on the plurality of contexts. A plurality of answerable questions are generated further based on the plurality of contexts using an unsupervised template-based matching technique. Further, a combined plurality of questions are generated by combining the first plurality of questions and the plurality of answerable questions. Further, an answer for the combined plurality of questions are generated using an autoregressive language model and a mapping score is computed. Further, a plurality of optimal answers are selected based on the corresponding (Continued)

Technical textbook Documents

Context extraction module 202

Answer generation module 212

Question generation module 204

Optimized autoregressive model 206

Template matching module 208

Token matching based scoring module 214

Optimal answer selection module 216

Combined question generation module 210

Dataset generation module 218 mapping score. Finally, a longform technical question and answer dataset is generated based on the combined plurality of questions and optimal answers.

14 Claims, 5 Drawing Sheets

(51) Int. Cl.

| | | |
|---|---|---|
| *G06F 40/186* | (2020.01) | |
| *G06F 40/284* | (2020.01) | |
| *G06F 40/40* | (2020.01) | |

(56) References Cited

U.S. PATENT DOCUMENTS

| | | | | |
|---|---|---|---|---|
| 2014/0106331 | A1* | 4/2014 | Mitalski | G09B 5/08 |
| | | | | 434/350 |
| 2014/0141401 | A1* | 5/2014 | Agarwal | G06N 5/02 |
| | | | | 434/359 |
| 2017/0228361 | A1* | 8/2017 | Zhang | G06F 16/313 |
| 2018/0260472 | A1* | 9/2018 | Kelsey | G06F 40/56 |
| 2021/0004540 | A1* | 1/2021 | Harper | G06F 40/30 |
| 2022/0092095 | A1* | 3/2022 | Shukla | G06F 16/34 |
| 2022/0269713 | A1* | 8/2022 | Wang | G06F 16/345 |
| 2022/0358225 | A1* | 11/2022 | Gadde | H04L 51/02 |

OTHER PUBLICATIONS

Lindberg, David Lennart, "Automatic question generation from text for self-directed learning", Publisher: Simon Fraser University, Link: https://summit.sfu.ca/item/12985.

Prashant, "Create a question-answer service using GPT-3 and OpenAI", Date: Jan. 23, 2022, Publisher:Geek Culture, Link: https://medium.com/geekculture/create-a-question-answer-service-using-qpt-3-and-openai-41498c73879b.

Puri, Raul et al., "Training Question Answering Models From Synthetic Data", Title of the item: Proceedings of the 2020 Conference on Empirical Methods in Natural Language Processing (EMNLP), Date: Nov. 2020, pp.: 5811-5826, Publisher: Association for Computational Linguistics, Link: https://aclanthology.org/2020.emnlp-main.468.pdf.

Ray, Arijit et al., "Sunny and Dark Outside?! Improving Answer Consistency in VQA through Entailed Question Generation", Title of the item: 2019 Conference on Empirical Methods in Natural Language Processing, Date: Sep. 10, 2019, Publisher: arXIV, Link: https://arxiv.org/abs/1909.04696.

Mohamed, Muhidin A. et al., "A hybrid approach for paraphrase identification based on knowledge-enriched semantic heuristics", Title of the item: Language Resources and Evaluation, Date: Jun. 2020, pp. 1-29, vol. issue No. 54(02), Publisher: Springer Nature, Link: https://researchgate.net/publication/332457497 A hybrid approach for paraphrase identification based on knowledge-enriched semantic heuristics.

* cited by examiner

100

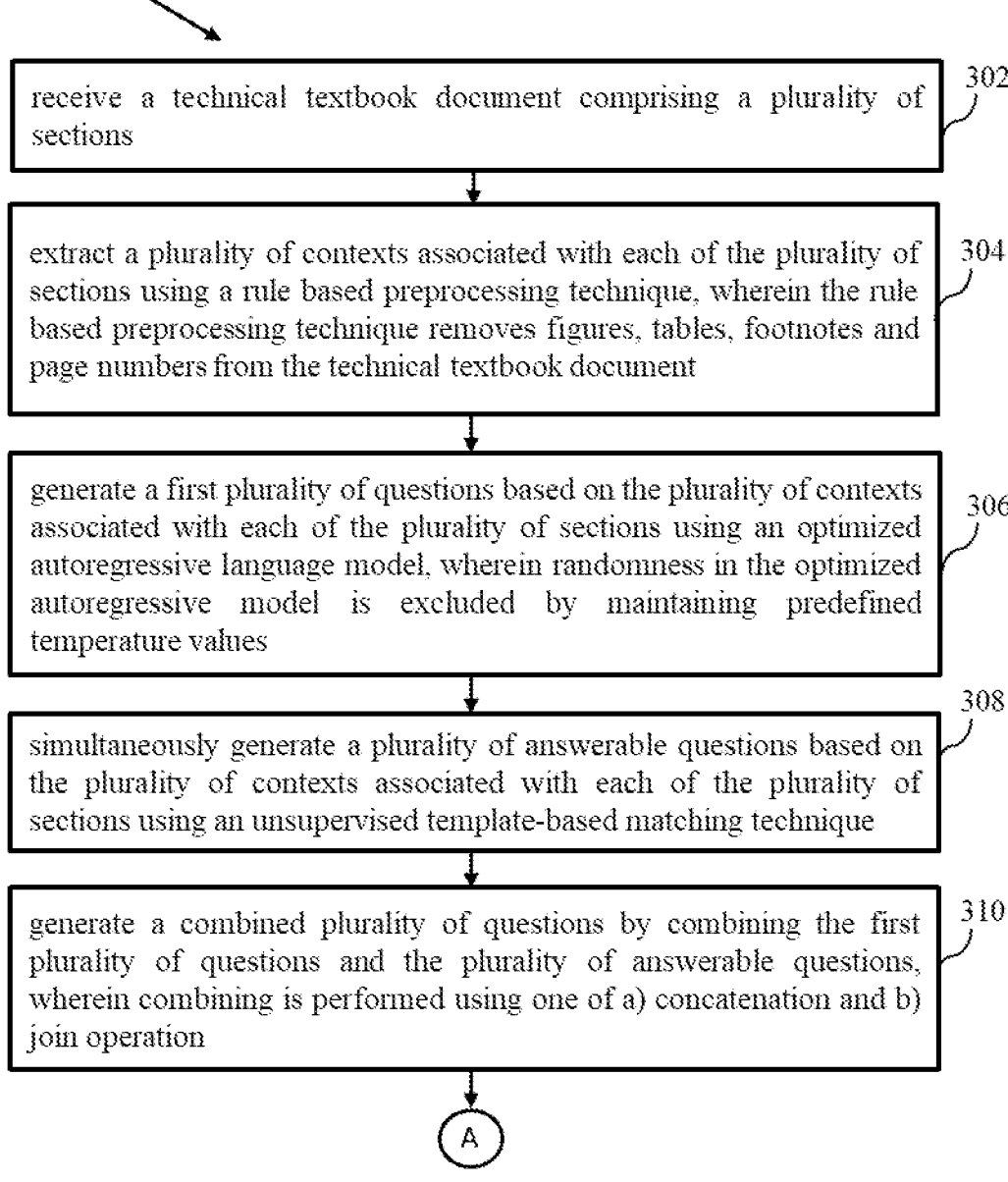

300 receive a technical textbook document comprising a plurality of sections ⌐302 extract a plurality of contexts associated with each of the plurality of sections using a rule based preprocessing technique, wherein the rule based preprocessing technique removes figures, tables, footnotes and page numbers from the technical textbook document ⌐304 generate a first plurality of questions based on the plurality of contexts associated with each of the plurality of sections using an optimized autoregressive language model, wherein randomness in the optimized autoregressive model is excluded by maintaining predefined temperature values ⌐306 simultaneously generate a plurality of answerable questions based on the plurality of contexts associated with each of the plurality of sections using an unsupervised template-based matching technique ⌐308 generate a combined plurality of questions by combining the first plurality of questions and the plurality of answerable questions, wherein combining is performed using one of a) concatenation and b) join operation ⌐310

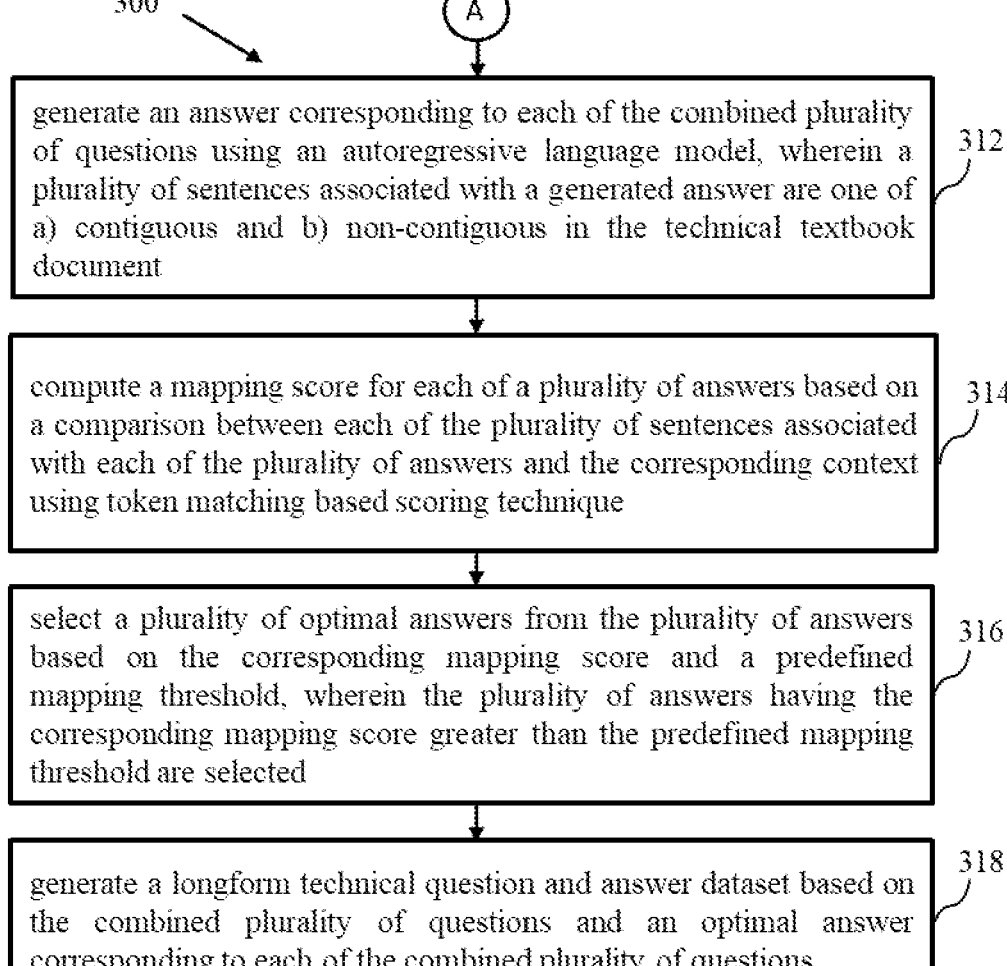

300

A generate an answer corresponding to each of the combined plurality of questions using an autoregressive language model, wherein a plurality of sentences associated with a generated answer are one of a) contiguous and b) non-contiguous in the technical textbook document
312 compute a mapping score for each of a plurality of answers based on a comparison between each of the plurality of sentences associated with each of the plurality of answers and the corresponding context using token matching based scoring technique
314 select a plurality of optimal answers from the plurality of answers based on the corresponding mapping score and a predefined mapping threshold, wherein the plurality of answers having the corresponding mapping score greater than the predefined mapping threshold are selected
316 generate a longform technical question and answer dataset based on the combined plurality of questions and an optimal answer corresponding to each of the combined plurality of questions
318

receive a plurality of templates, a plurality of concepts corresponding to each of the plurality of templates and a plurality of signals corresponding to each of the plurality of templates, wherein the plurality of templates are generated based on Bloom's taxonomy

402 obtain a plurality of atomic concepts corresponding to each of the plurality of templates based on a comparison between each of a plurality of sentences associated with each of the plurality of contexts and a sorted plurality of concepts corresponding to each of the plurality of templates

404 obtain a plurality maximal concepts based on the plurality of atomic concepts and the plurality of signals by identifying at least one of a) a pair of atomic concepts from the plurality of atomic concepts, separated by a signal from the plurality of signals and b) a pair of atomic concepts from the plurality of atomic concepts adjacent to each other, using token matching technique

406 generate the plurality of answerable questions corresponding to each of the plurality of templates based on the plurality of sentences associated with each of the plurality of contexts, a corresponding plurality of atomic concepts and a corresponding plurality of maximal concepts using a corresponding template matching algorithm

METHOD AND SYSTEM FOR GENERATING LONGFORM TECHNICAL QUESTION AND ANSWER DATASET

PRIORITY CLAIM

This U.S. patent application claims priority under 35 U.S.C. § 119 to: Indian Patent Application No. 202221057973, filed on Oct. 10, 2022. The entire contents of the aforementioned application are incorporated herein by reference.

TECHNICAL FIELD

The disclosure herein generally relates to the field of natural language processing and, more particularly, to a method and system for generating longform technical question and answer dataset.

BACKGROUND

Assessing candidates in technical interviews is crucial for organizations to select appropriate manpower and Question and Answer Generation (QAG) plays a major role in it. However, QAG requires human experts with technical knowledge and experience, which is a time consuming process. Therefore, the capability to automatically generate technical questions to assess knowledge and understanding for a specific subject can significantly reduce expert effort in conducting interviews and in scaling up the interview process. Hence, there has been a lot of interest in recent years on automated QAG. However, automated QAG requires optimal QA datasets for training.

There are many benchmark datasets available in the art. However, the existing benchmark datasets focus on rule-based question generation. For example, the existing benchmark datasets are used to generate question-answer pairs using syntactic rules, universal dependencies, shallow semantic parsing and lexical resources. Some other conventional datasets like Freebase, used for QA generation in deep neural networks, can be used to generate only factoid questions (questions with answer span of one two words). In summary, all conventional benchmark datasets address factoid question generation for Reading Comprehension (RC) or rule-based/static question generation and fails to address dynamic longform technical questions and answer generation. Hence, there a need for generating optimal dataset for longform QAG generation.

SUMMARY

Embodiments of the present disclosure present technological improvements as solutions to one or more of the above-mentioned technical problems recognized by the inventors in conventional systems. For example, in one embodiment, a method for generating longform technical question and answer dataset is provided. The method includes receiving, by one or more hardware processors, a technical textbook document comprising a plurality of sections. Further, the method includes extracting, by the one or more hardware processors, a plurality of contexts associated with each of the plurality of sections using a rule based preprocessing technique. Furthermore, the method includes generating, by the one or more hardware processors, a first plurality of questions based on the plurality of contexts associated with each of the plurality of sections using an optimized autoregressive language model, wherein randomness in the optimized autoregressive model is excluded by maintaining predefined temperature values. Furthermore, the method includes simultaneously generating, by the one or more hardware processors, a plurality of answerable questions based on the plurality of contexts associated with each of the plurality of sections using an unsupervised template-based matching technique. Furthermore, the method includes generating, by the one or more hardware processors, a combined plurality of questions by combining the first plurality of questions and the plurality of answerable questions, wherein combining is performed using one of a) concatenation and b) join operation. Furthermore, the method includes generating, by the one or more hardware processors, an answer corresponding to each of the combined plurality of questions using an autoregressive language model, wherein a plurality of sentences associated with a generated answer are one of a) contiguous and b) non-contiguous in the technical textbook document. Furthermore, the method includes computing, by the one or more hardware processors, a mapping score for each of a plurality of answers based on a comparison between each of the plurality of sentences associated with each of the plurality of answers and the corresponding context using token matching based scoring technique. Furthermore, the method includes selecting, by the one or more hardware processors, a plurality of optimal answers from the plurality of answers based on a corresponding mapping score and a predefined mapping threshold, wherein the plurality of answers having the corresponding mapping score greater than the predefined mapping threshold are selected. Finally, the method includes generating, by the one or more hardware processors, a longform technical question and answer dataset based on the combined plurality of questions and an optimal answer corresponding to each of the combined plurality of questions.

In another aspect, a system for generating longform technical question and answer dataset is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a technical textbook document comprising a plurality of sections. Further, the one or more hardware processors are configured by the programmed instructions to extract, a plurality of contexts associated with each of the plurality of sections using a rule based preprocessing technique. Furthermore, the one or more hardware processors are configured by the programmed instructions to generate a first plurality of questions based on the plurality of contexts associated with each of the plurality of sections using an optimized autoregressive language model, wherein randomness in the optimized autoregressive model is excluded by maintaining predefined temperature values. Furthermore, the one or more hardware processors are configured by the programmed instructions to simultaneously generate a plurality of answerable questions based on the plurality of contexts associated with each of the plurality of sections using an unsupervised template-based matching technique. Furthermore, the one or more hardware processors are configured by the programmed instructions to generate a combined plurality of questions by combining the first plurality of questions and the plurality of answerable questions, wherein combining is performed using one of a) concatenation and b) join operation. Furthermore, the one or more hardware processors are configured by the programmed instructions to generate an answer corresponding to each of the combined plurality of questions using an autoregressive language model, wherein a plurality of sentences associated with a generated answer are one of a) contiguous and b) non-contiguous in the technical textbook document. Furthermore, the one or more hardware processors are configured by the programmed instructions to compute a mapping score for each of a plurality of answers based on a comparison between each of the plurality of sentences associated with each of the plurality of answers and the corresponding context using token matching based scoring technique. Furthermore, the one or more hardware processors are configured by the programmed instructions to select a plurality of optimal answers from the plurality of answers based on a corresponding mapping score and a predefined mapping threshold, wherein the plurality of answers having the corresponding mapping score greater than the predefined mapping threshold are selected. Finally, the one or more hardware processors are configured by the programmed instructions to generate a longform technical question and answer dataset based on the combined plurality of questions and an optimal answer corresponding to each of the combined plurality of questions.

In yet another aspect, a computer program product including a non-transitory computer-readable medium having embodied therein a computer program for generating longform technical question and answer dataset is provided. The computer readable program, when executed on a computing device, causes the computing device to receive a technical textbook document comprising a plurality of sections. Further, the computer readable program, when executed on a computing device, causes the computing device to extract, a plurality of contexts associated with each of the plurality of sections using a rule based preprocessing technique. Furthermore, the computer readable program, when executed on a computing device, causes the computing device to generate a first plurality of questions based on the plurality of contexts associated with each of the plurality of sections using an optimized autoregressive language model, wherein randomness in the optimized autoregressive model is excluded by maintaining predefined temperature values. Furthermore, the computer readable program, when executed on a computing device, causes the computing device to simultaneously generate a plurality of answerable questions based on the plurality of contexts associated with each of the plurality of sections using an unsupervised template-based matching technique. Furthermore, the computer readable program, when executed on a computing device, causes the computing device to generate a combined plurality of questions by combining the first plurality of questions and the plurality of answerable questions, wherein combining is performed using one of a) concatenation and b) join operation. Furthermore, the computer readable program, when executed on a computing device, causes the computing device to generate an answer corresponding to each of the combined plurality of questions using an autoregressive language model, wherein a plurality of sentences associated with a generated answer are one of a) contiguous and b) non-contiguous in the technical textbook document. Furthermore, the computer readable program, when executed on a computing device, causes the computing device to compute a mapping score for each of a plurality of answers based on a comparison between each of the plurality of sentences associated with each of the plurality of answers and the corresponding context using token matching based scoring technique. Furthermore, the computer readable program, when executed on a computing device, causes the computing device to select a plurality of optimal answers from the plurality of answers based on a corresponding mapping score and a predefined mapping threshold, wherein the plurality of answers having the corresponding mapping score greater than the predefined mapping threshold are selected. Finally, the computer readable program, when executed on a computing device, causes the computing device to generate a longform technical question and answer dataset based on the combined plurality of questions and an optimal answer corresponding to each of the combined plurality of questions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B are exemplary flow diagrams illustrating a processor implemented method 300 for generating longform technical question and answer dataset implemented by the system of FIG. 1 according to some embodiments of the present disclosure.

FIG. 4 is an exemplary flow diagram illustrating a processor implemented method 400 for generating answerable questions, implemented by the system of FIG. 1 according to some embodiments of the present disclosure.

DETAILED DESCRIPTION

Figure 1:
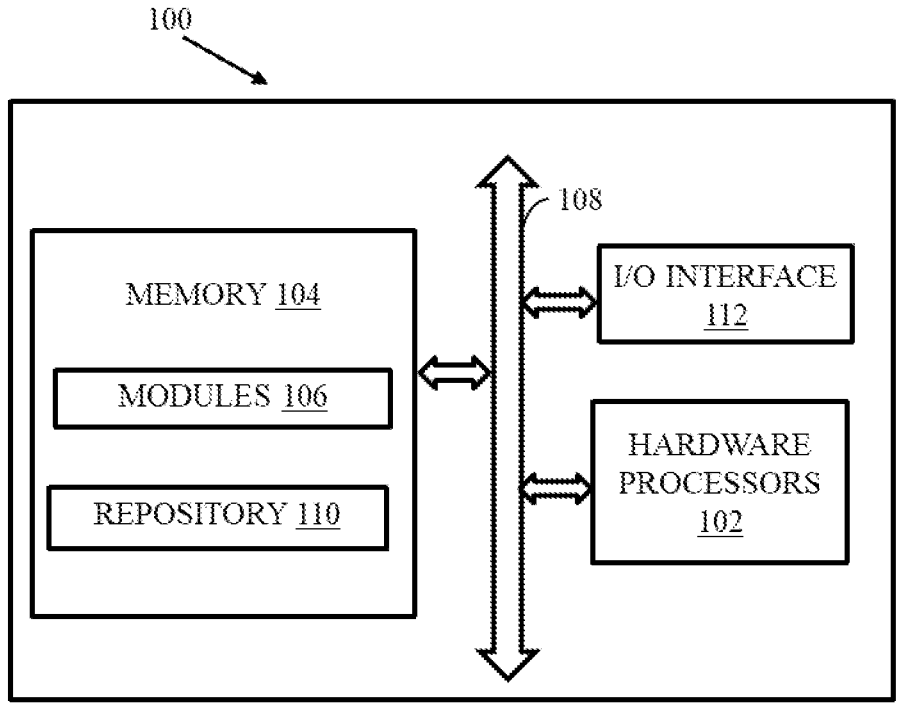
FIG. 1 is a functional block diagram of a system for generating longform technical question and answer dataset, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Generating technical interview questions from a context is harder than generating Reading Comprehension (RC) questions. Context based questions focus on technical concepts and their relationships, which can be used for testing knowledge and understanding of specific technical concepts. Here, the answers are in long-form (for example, 2 to 5 sentences) and must be contained in the context. Further, questions must be semantically complete, for example, the question "What is the form of the optimal solution?' is an incomplete question and the questions should be with appropriate specificity (for example, 'What is machine learning' is too generic for assessing expertise in machine learning"). Similarly, questions should have a diverse mix of intent and task complexity, compared to just remembering. Hence, RC-question generation models are not appropriate for interview question generation, and RC-question generation data sets are not useful for evaluating interview question generation models.

To address this gap, the present disclosure generates an optimal dataset with Question and Answer (QA) based on contexts of technical textbooks. Further, the created dataset is used for evaluating interview question generation models like autoregressive models.

Embodiments herein provide a method and system for generating longform technical question and answer dataset based on context of the technical textbook documents. Initially, the system receives a technical textbook document comprising a plurality of sections. Further, a plurality of contexts corresponding to each of the plurality of sections are extracted using a rule based preprocessing technique. Further, a first plurality of questions are generated based on the plurality of contexts using an optimized autoregressive language model. A plurality of answerable questions are generated further based on the plurality of contexts corresponding to each of the plurality of sections using an unsupervised template-based matching technique. After generating the plurality of answerable questions, a combined plurality of questions are generated by combining the first plurality of questions and the plurality of answerable questions. Further, the present disclosure generates an answer corresponding to each of the combined plurality of questions using an autoregressive language model. Further, a mapping score corresponding to each of a plurality of answers is computed based on a comparison between each of the plurality of sentences associated with each of the plurality of answers and the corresponding context using token matching based scoring technique. After computing the mapping score, a plurality of optimal answers are selected from the plurality of answers based on the corresponding mapping score and a predefined mapping threshold. Finally, the present disclosure generates a longform technical question and answer dataset based on the combined plurality of questions and an optimal answer corresponding to each of the combined plurality of questions.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a system for generating longform technical question and answer dataset, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
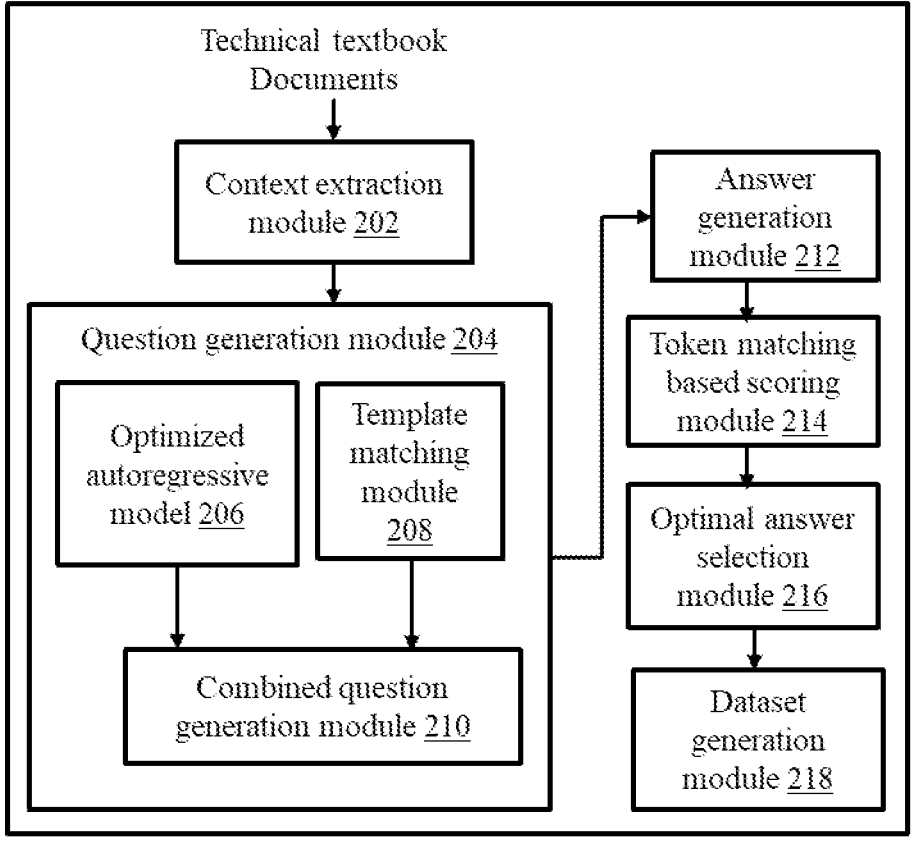
FIG. 2 illustrates a functional architecture of the system of FIG. 1, for generating longform technical question and answer dataset, in accordance with some embodiments of the present disclosure.

The plurality of modules 106 include programs or coded instructions that supplement applications or functions performed by the system 100 for generating longform technical question and answer dataset. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 include a context extraction module (shown in FIG. 2) and a question generation module (shown in FIG. 2), an answer generation module (shown in FIG. 2), a token matching based scoring module (shown in FIG. 2), an optimal answer selection module (shown in FIG. 2) and a dataset generation module (shown in FIG. 2). The question generation module includes an optimized autoregressive model (shown in FIG. 2), a template matching module (shown in FIG. 2) and a combine question generation module (shown in FIG. 2). In an embodiment, FIG. 2 illustrates a functional architecture of the system of FIG. 1, for generating longform technical question and answer dataset, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3, FIG. 6A and FIG. 6B.

FIGS. 3A and 3B are exemplary flow diagram illustrating a method 300 for generating longform technical question and answer dataset implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIGS. 3A and 3B. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive the technical textbook document including a plurality of sections. In an embodiment, the technical textbook document is in Portable Document Format (PDF) format.

At step 304 of the method 300, the context extraction module 202 executed by one or more hardware processors 102 is configured by the programmed instructions to extract a plurality of contexts associated with each of the plurality of sections using the rule based preprocessing technique. The rule based preprocessing technique removes a plurality of document sentence structures including figures, tables, footnotes and page numbers from the technical textbook document. For example, for removing figures, the captions like "FIG.:" and "Figure: "are used and are removed. Similarly, the tables are identified using the pattern "Tab" or "Table" in the text and removed. The beginning or ending of page is detected using newlines "(\n)".

At step 306 of the method 300, the optimized autoregression module 206 executed by the one or more hardware processors 102 is configured by the programmed instructions to generating the first plurality of questions based on the plurality of contexts associated with each of the plurality of sections using the optimized autoregressive language model. A randomness in the optimized autoregressive model is excluded by maintaining predefined temperature values.

Generally, temperature value of autoregressive model ranges from zero to one, wherein temperature value as "zero" indicates no randomness and the temperature value as "one" indicates high randomness. For example, for a given context, if the temperature value is set to "zero", the autoregressive model generates same set of questions multiple times. If the temperature value is set to "one", then the autoregressive model randomly generates different set of questions every time. The predefined temperature value used in the present disclosure is "zero" to avoid randomness in question generation. In an embodiment, a third generation Generative Pre-trained Transformer (GPT-3) is used for generating the first plurality of questions. GPT-3 is a neural network ML model trained using internet data to generate any type of text. GPT-3 is Developed by OpenAI and requires a small amount of input text to generate large volumes of relevant and sophisticated machine-generated text. The GPT-3 is a transformer decoder based large language model (LLM) and has shown excellent performance on many NLP tasks in zero-shot settings.

At step 308 of the method 300, the template matching module 208 executed by the one or more hardware processors 102 is configured by the programmed instructions to simultaneously generate the plurality of answerable questions based on the plurality of contexts associated with each of the plurality of sections using the unsupervised template-based matching technique. The method of generating the plurality of answerable questions based on the plurality of contexts corresponding to each of the plurality of sections using the unsupervised template based matching technique is explained in conjunction with FIG. 4.

FIG. 4 is an exemplary flow diagram illustrating a processor implemented method 400 for generating answerable questions, implemented by the system of FIG. 1 according to some embodiments of the present disclosure. Now referring to FIG. 4, at step 402 of the method 400, the one or more hardware processors 102 are configured by the programmed instructions to receive a plurality of templates, a plurality of concepts corresponding to each of the plurality of templates and a plurality of signals corresponding to each of the plurality of templates, wherein the plurality of templates are generated based on Bloom's taxonomy. The plurality of signals are template specific keywords and phrases associated with a specific concept. The plurality of concepts are obtained from table of contents and index associated with the technical textbook document.

The Bloom's taxonomy defines 6 categories of knowledge in terms of skills/abilities in an increasing order of cognitive load. For example, Bloom's categories are: (i) Remember ('What is X?') (ii) Understand ('How does SUB V X?'), (iii) apply ('How will you apply X?'), (iv) analyze ('Analyze X in terms of Y'), (v) evaluate ('Compute the values of X and Y'), (vi) Create (develop an algorithm to compute X). Here, X and Y refer to the concepts of the topic.

In an embodiment, some of the example templates includes the following: 1) WHAT IS X? 2) WHAT ARE ADVANTAGES/DISADVANTAGES/USES OF X? 3) WHAT ARE THE DIFFERENCES BETWEEN X AND Y? 4) WHAT IS THE RELATION BETWEEN X AND Y? and the like.

At step 404 of the method 400, the one or more hardware processors 102 are configured by the programmed instructions to obtain a plurality of atomic concepts corresponding to each of the plurality of templates based on a comparison between each of a plurality of sentences associated with each of the plurality of contexts and a sorted plurality of concepts corresponding to each of the plurality of templates.

For example, the atomic concepts from a ML based textbook are "pooling", "convolutional", "neural", "network", "auto-encoder" and the like.

In an embodiment, the pseudocode for generating the plurality of atomic concepts is given below as pseudocode 1. Initially, an exhaustive list of concepts are obtained from the index and the table of contents of the technical textbook. Further, the pseudocode 1 iteratively searches the plurality of sentences for the presence of concepts from the exhaustive list of concepts using string matching and returns the plurality of identified concepts.

---

PSEUDOCODE 1: Obtaining atomic concepts

---

```
def find_atomic_concepts_in_a_sentence(sorted_concepts,
sentence):
    concept_list = [ ]
    if line:
        for concept in sorted_concepts:
            if check_concept(concept, sentence):
                start_index = sentence.index(concept)
                length = len(concept)
                concept_list+= find_atomic_concepts_in_a_sentence(sorte
d_conc epts, sentence[:start_index].strip( ))
                concept_list.append(concept)
                concept_list+= find_atomic_concepts_in_a_sentenc(sorted
_concepts, sentence[start_index + length:].strip( ))
                break
    return concept_list
```

---

At step 406 of the method 400, the one or more hardware processors 102 are configured by the programmed instructions to obtain a plurality maximal concepts based on the plurality of atomic concepts and the plurality of signals by identifying at least one of a) a pair of atomic concepts from the plurality of atomic concepts, separated by a signal from the plurality of signals and b) a pair of atomic concepts from the plurality of atomic concepts adjacent to each other, using token matching technique (For example, "convolution" and "neural network" can combine to "convolution neural network").

In an embodiment, the method of obtaining maximal concepts from the pair of atomic concepts separated by a signal from the plurality of signals is defined below: a predefined list of connectives which connects the plurality of concepts are used in the present disclosure. For example, the predefined list of connectives are ['attribute', 'attribute in', 'attribute of', 'attribute for', 'component', 'component in', 'component of', 'component for', 'feature', 'feature in', 'feature for', 'feature of', 'type of', 'type in', 'part of', 'part in', 'type', 'for', 'in', 'of']. Given this list of connectives, if "Pooling", "Convolution", "Neural Network" are three atomic concepts and "component of" is a defined connective then "Pooling component of Convolution Neural Network" is a maximal concept if it appears in any of the input sentences.

In an embodiment, the pseudocode for generating the plurality maximal concepts is given below as pseudocode 1: Now referring to pseudocode 2, pseudocode 2 identifies the atomic concepts present in the sentence and sorts them by their appearances in the sentence. Further, the plurality of composite concepts are created by combining atomic concepts and connectives in the sentence. Finally, the plurality of maximal concepts present in the plurality of sentences are returned.

---

PSEUDOCODE 2: Obtaining maximal concepts

---

```
def findmaximal_concepts(concepts, sentence):
    positions = [ ]
    comp_con = set( )
    dct = ['attribute', 'attribute in', 'attribute of', 'attribute for',
'component', 'component in', 'component of', 'component for',
'feature', 'feature in', 'feature for', 'feature of', 'type of', 'type in', 'part
of', 'part in', 'type', 'for', 'in', 'of']
    # print(concepts)
    # concepts = list(set(concepts))
    for i in range(len(concepts)):
        # print(sen, concepts[i], sen.find(" " + concepts[i]))
        if concepts[i].endswith("(") or concepts[i]=="c++" or
concepts[i].endswith(")") or concepts[i].endswith("{") or
concepts[i].endswith("}") or concepts[i].endswith("[") or
concepts[i].endswith("]"):
            continue
        pos = [m.start( ) for m in re.finditer(" " + concepts[i] + " ", sen)]
        if sen.startswith(concepts[i] + " "):
            pos.append(0)
        if sen.endswith(" " + concepts[i]):
            pos.append(len(sen) - len(concepts[i]))
            # print(len(sen) - len(concepts[i]))
        if len(pos) == 1:
            positions.append([pos[0], concepts[i]])
        else:
            for p in pos:
                positions.append([p, concepts[i]])
        # positions.append(sen.find(" " + concepts[i]))
    # con = [i for , i in sorted(positions)]
    con = concepts
    concept_to_remove = [ ]
    for i in range(len(con) - 1):
        for j in dct:
            c_con = con[i] + " " + j + " " + con[i + 1]
            if c_con in sen:
                comp_con.add(c_con)
                # if con[i] in concept_to_remove:
concept_to_remove.remove(con[i])
                concept_to_remove.append(con[i])
                concept_to_remove.append(con[i + 1])
        if con[i] + " " + con[i + 1] in sen:
            comp_con.add(con[i] + " " + con[i + 1])
            # if con[i] in concept_to_remove:
concept_to_remove.remove(con[i])
            concept_to_remove.append(con[i])
            concept_to_remove.append(con[i + 1])
        if con[i] + "'s" + con[i + 1] in sen:
            comp_con.add(con[i] + "'s" + con[i + 1])
            # if con[i] in concept_to_remove:
concept_to_remove.remove(con[i])
            concept_to_remove.append(con[i])
            concept_to_remove.append(con[i + 1])
        if con[i] + "-based " + con[i + 1] in sen:
            comp_con.add(con[i] + "-based " + con[i + 1])
            # if con[i] in concept_to_remove:
concept_to_remove.remove(con[i])
            concept_to_remove.append(con[i])
            concept_to_remove.append(con[i + 1])
    comp_con = list(comp_con)
    # print(con)
    # print(concept_to_remove)
    for c in set(concept_to_remove):
        # print(c)
        con.remove(c)
    con.extend(comp_con)
    # print(con)
    # print(concept_to_remove)
    return con
------------------------------------------------------------
concept_list
= find_atomic_concepts_in_a_sentence(all_index_toc_concept,
sentence)
maximal_concept_list = findmaximal_concepts(concept_list,
sentence)
```

---

At step 408 of the method 400, the one or more hardware processors 102 are configured by the programmed instructions to generate the plurality of answerable questions corresponding to each of the plurality of templates based on the plurality of sentences associated with each of the plurality of contexts, a corresponding plurality of atomic concepts and a corresponding plurality of maximal concepts using a corresponding template matching algorithm.

In an embodiment, the template matching algorithm for generating "difference" questions like "WHAT ARE THE DIFFERENCES BETWEEN X AND Y?" is given below in pseudocode 3. Now referring to pseudocode 3, Let C_list={c1, c2, c3, . . . } be a list of concepts present in the technical textbook document, created using the index and Table of content of the technical textbooks. Multiple atomic concepts can combine to form a maximal concept. There can be multiple maximal concept in a sentence which are stored in a list denoted by Mx_c_list. Other than concepts present in the sentence template specific keywords or phrases which either give hints for attributes of a concept or relationship between two concepts are also considered. For example, presence of "difference between" in a sentence hints the possibility of distinctions between two concepts being discussed. A function Is_signal_present (sentence,signal_list, X,Y) is defined which takes a sentence of a book, signal lists and concepts X, Y and returns true if signal along with concepts X and Y are present in the sentence to generate a question out of it. Here, X and Y refers to some concepts in the topic for which questions are generated.

---

PSEUDOCODE 3: for generating "difference"
template based questions

---

```
for sentence in context do
    Mx_c_list = find_maximal_concept (sentence, C_list)
    for X in Mx_c_list do
        for Y in Mx_c_list do
            flag = Is_signal_present(sentence, signal_list, X,Y )
                if flag then Q_gen: What is the difference between X and
Y ?
            end if
        end for
    end for
end for
```

---

In an embodiment, some examples of template generated PG-3T questions from context is shown in Table I.

TABLE I

| Context | Questions |
| --- | --- |
| An autoencoder is a neural network that is trained to attempt to copy its input to its output. Internally, it has a hidden layer h that describes a code used to represent the input. . . . Recently, theoretical connections between autoencoders and latent variable models have brought autoencoders to the forefront of generative modeling. | What is an autoencoder? What is the relation between autoencoders and latent variable? |
| One advantage of directed graphical models is that a simple and efficient procedure called ancestral sampling can produce a sample from the joint distribution represented by the model. . . . Ancestral sampling is generally very fast (assuming sampling from each conditional is easy) and convenient. One drawback to ancestral sampling is that it only applies to directed graphical models. Another drawback is that it does not support every conditional sampling operation. . . . | What is ancestral sampling? What are advantages of ancestral sampling? What are disadvantages of ancestral sampling? |

TABLE I-continued

| Context | Questions |
| --- | --- |
| Unlike the deep belief network (DBN), it is an entirely undirected model. Unlike the RBM, the DBM has several layers of latent variables (RBMs have just one). . . . A DBM is an energy-based model, meaning that the joint probability distribution over the model variables is parametrized by an energy function E. . . . In comparison to fully connected Boltzmann machines (with every unit connected to every other unit), the DBM offers some advantages that are similar to those offered by the RBM. . . . | What are some use of the DBM? What are differences between the RBM and the DBM? What is a DBM? |

Now referring back to FIGS. 3A and 3B, at step 310 of the method 300, the combined question generation module 210 executed by the one or more hardware processors 102 is configured by the programmed instructions to generate the combined plurality of questions by combining the first plurality of questions and the plurality of answerable questions. In an embodiment, the first plurality of questions and the plurality of answerable questions are combined using concatenation. In another embodiment, the first plurality of questions and the plurality of answerable questions are combined using join operation.

At step 312 of the method 300, the answer generation module 212 executed by the one or more hardware processors 102 is configured by the programmed instructions to generate an answer corresponding to each of the combined plurality of questions using the autoregressive language model. The plurality of sentences associated with a generated answer is either contiguous or non-contiguous in the technical textbook document. For example, for a given question "What is the difference between classification and regression?"and the context". . . . We now discuss an analogous class of models for solving classification problems. The goal in classification is to take an input vector x and to assign it to one of K discrete classes Ck where k=1, . . . , K. In the most common scenario, the classes are taken to be disjoint, so that each input is assigned to one and only one class. The input space is thereby divided into decision regions whose boundaries are called decision boundaries or decision surfaces. In this chapter, we consider linear models for classification, by which we mean that the decision surfaces are linear functions of the input vector x and hence are defined by (D-1)-dimensional hyper-planes within the D-dimensional input space. Data sets whose classes can be separated exactly by linear decision surfaces are said to be linearly separable. For regression problems, the target variable t was simply the vector of real numbers whose values we wish to predict. In the case of classification, there are various ways of using target values to represent class labels . . . ", The non-contiguous answer for the question "What is the difference between classification and regression?" is "The goal in classification is to take an input vector x and to assign it to one of K discrete classes Ck where k=1, . . . , K. In the most common scenario, the classes are taken to be disjoint, so that each input is assigned to one and only one class. For regression problems, the target variable t was simply the vector of real numbers whose values we wish to predict".

At step 314 of the method 300, the token matching based scoring module 214 executed by the one or more hardware processors 102 is configured by the programmed instructions to compute the mapping score for each of the plurality of answers based on the comparison between each of the plurality of sentences associated with each of the plurality of answers and the corresponding context using token matching based scoring technique. For example, given the context and the generated answer for a question as input to the token matching based scoring algorithm, it outputs a score and the map-backed answer from the context. The algorithm compare each sentence $\alpha_i$ in the generated answer with each sentence $c_j$ in the context using token matching and calculate score $s_{ij}$=match $(\alpha_i, c_j)$. The score $s_{ij}$ depends on the ratio of number of matched tokens and total number of tokens in the answer sentence.

At step 316 of the method 300, the optimal answer selection module 216 executed by the one or more hardware processors 102 is configured by the programmed instructions to select the plurality of optimal answers from the plurality of answers based on a corresponding mapping score and the predefined mapping threshold. The plurality of answers having the corresponding mapping score greater than the predefined mapping threshold are selected.

For example, if $s_{ij}$ is greater than the predefined mapping threshold T, then $c_j$ is included in the map-backed answer list and marked it so that it is not considered for matching for subsequent answer sentences. If multiple context sentence has $s_{ij}$>T against an answer sentence $\alpha_i$, the context sentence $c_j$ having maximum score is selected in the map-backed answer. If map-backed answer is empty for a question, then that question is not answerable from the context and that question is excluded from the question and answer dataset/ question bank. This algorithm is used for two purposes a) To map-back the generated answers by autoregressive language models into extracted answer b) To ensure the answerability of the autoregressive model generated questions. An example illustration is given in table II.

TABLE II

| Question | Context | Answer generated by GPT-3 | Mapped back answer |
|---|---|---|---|
| What is an autoencoder? | . . . An autoencoder is a neural network that is trained to attempt to copy its input to its output. Internally, it has a hidden layer h that describes a code used to represent the input. . . . | An autoencoder is a type of neural network which attempts to copy its input to its output. It has a multiple hidden layers that creates a representation of the input. | An autoencoder is a neural network that is trained to attempt to copy its input to its output. Internally, it has a hidden layer h that describes a code used to represent the input. |

At step 318 of the method 300, the dataset generation module 218 executed by the one or more hardware processors 102 are configured by the programmed instructions to generate the longform technical question and answer dataset based on the combined plurality of questions and the optimal answer corresponding to each of the combined plurality of questions.

Experimentation Details

In an embodiment, the present disclosure is experimented as follows: In an embodiment, initially, the Bidirectional Auto-Regressive Transformers (BART) base model is trained with Stanford Question Answer Dataset (SQuAD) dataset. Further, the BART trained with SQuAD dataset is used for further experimentation. All experiments are done on 64 GB CPU with 20 cores. In an embodiment, a batch size of 16 is used for further training of the BART model for 10 epochs. The average time to train for 10 epochs is around 2 hours. The model parameters were optimized using Adam optimizer with a learning rate of 0.0001. Some contexts in the generated dataset is longer than what BART encoder can accommodate (1,024 word piece tokens). During training, the present disclosure utilized the first 1,024 token of the context and discard the remaining part of the context. During inference, the longer context were split into multiple chunks of 1,024 tokens and run inference on each one of them. Further, the generated questions from all the splits are combined using union operation. The precision of GPT-3 is 53%. Fine-tuned BART in 'Concat' (concatenation) mode has 64% precision and 11% improvement over GPT-3 is obtained after training with the generated answerable long-form QA dataset.

In an embodiment, the generated optimal question and answer dataset are evaluated based on a plurality of evaluation metrics. The plurality of evaluation metric includes a long-formnes, a question completeness, a question complexity, a complexity diversity, a concept coverage diversity and a sentence level precision. In an embodiment, the long-formnes checks whether each of the plurality of optimal answers includes at least two sentences.

In an embodiment, the question completeness checks whether the plurality of answerable questions does not have any unresolved co-reference and indefinite words. For example, 15% of all GPT-3 questions are incomplete. The following are some examples: Question 1: How can the issue of scale be prevented?, Question 2: What are some of the models that this technique can be applied to?. The percentage is slightly lower for fine-tuned BART in Concat mode (13%), but the nature of mistakes is similar.

In an embodiment, the question complexity identifies whether at least one concept is available in each of the plurality of answerable questions. The complexity diversity checks whether the plurality of answerable questions are with varying complexity range comprising easy, medium and hard. The concept coverage diversity checks whether the generated longform technical question and answer dataset includes concepts from each of the plurality of sections of the technical textbook. The sentence level precision indicates a percentage of correct answers.

In an embodiment, the model trained using the generated longform technical question and answer dataset for answer generation is evaluated in two ways: (i) sentence level evaluation, which evaluates, what percentage of answer sentences are predicted out of all answer sentences and (ii) token level evaluation, performed using n-gram matching based f-score calculation between predicted answer and gold answer. Here gold answer is a standard/actual answer. The sentence level evaluation includes precision, recall and f1 metrics. The token level evaluation includes token level Recall-Oriented Understudy for Gisting Evaluation (ROUGE-L) precision, recall and f1 metrics.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of generating longform technical question and answer dataset from contexts of technical textbook documents. Further, the present disclosure generates technical questions for interviews from textbook contexts and curated a dataset for evaluation. Furthermore. the present disclosure explored zero-shot question generation using GPT-3 and fine-tuning BART on curated dataset.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, a technical textbook document comprising a plurality of sections;

extracting, by the one or more hardware processors, a plurality of contexts associated with each of the plurality of sections using a rule based preprocessing technique, wherein the rule based preprocessing technique removes a plurality of document sentence structures including figures, tables, footnotes and page numbers from the technical textbook document;

generating, by the one or more hardware processors, a first plurality of questions by a neural network machine learning (ML) model, based on the plurality of contexts associated with each of the plurality of sections, wherein randomness in an optimized autoregressive model is excluded by maintaining predefined temperature values, wherein when a temperature value is set to "zero", the optimized autoregressive model generates same set of questions multiple times, wherein when the temperature value is set to "one", the optimized autoregressive model randomly generates varied set of questions every time, wherein the predefined temperature value is "zero" to avoid randomness in question generation;

simultaneously generating, by the one or more hardware processors, a plurality of answerable questions based on the plurality of contexts associated with each of the plurality of sections;

generating, by the one or more hardware processors, a combined plurality of questions by combining the first plurality of questions and the plurality of answerable questions, wherein combining is performed using one of a) concatenation and b) join operation;

generating, by the one or more hardware processors, an answer corresponding to each of the combined plurality of questions, wherein a plurality of sentences associated with a generated answer are one of a) contiguous and b) non-contiguous in the technical textbook document;

computing, by the one or more hardware processors, a mapping score for each of a plurality of answers based on a comparison between each of the plurality of sentences associated with each of the plurality of answers and the corresponding context by comparing each sentence $\alpha_i$ in the generated answer with each sentence $c_j$ in the context and calculating the mapping score $S_{ij} = \text{match}(a_i, C_j)$, wherein the mapping score $s_{ij}$ depends on a ratio of number of matched tokens and a total number of tokens in an answer sentence;

selecting, by the one or more hardware processors, a plurality of optimal answers from the plurality of answers based on a corresponding mapping score and a predefined mapping threshold, wherein the plurality of answers having the corresponding mapping score greater than the predefined mapping threshold are selected, wherein when the mapping score $S_{ij}$ is greater than the predefined mapping threshold T, then the $c_j$ is included in a map-backed answer list and marked that it is not considered for matching for subsequent answer sentences, wherein when multiple context sentences $S_{ij}$>T against an answer sentence $\alpha_i$, then the context sentence $c_j$ having maximum score is selected in the map-backed answer list, wherein when the map-backed answer list is empty for a question, then that question is not answerable from the context and that question is excluded from question and answer dataset, further achieves (1) map-back the generated answers by the optimized autoregressive model into an extracted answer, and (2) answerability of generated questions by the optimized autoregressive model;

generating, by the one or more hardware processors, a longform technical question and answer dataset based on the combined plurality of questions and an optimal answer corresponding to each of the combined plurality of questions, wherein the generated optimal question and answer dataset based on a plurality of evaluation metrics, wherein the plurality of evaluation metrics comprises the long-formness, a question completeness, a question complexity, a complexity diversity, a concept coverage diversity, and a sentence level precision, wherein the long-formness checks whether each of the plurality of optimal answers comprises at least two sentences, wherein the question completeness checks whether the plurality of answerable questions does not have any unresolved co-reference and indefinite words, wherein the question complexity identifies whether at least one concept is available in each of the plurality of answerable questions, wherein the complexity diversity checks whether the plurality of answerable questions are with varying complexity range comprising easy, medium and hard; and training a model with the generated longform technical question and answer dataset for answer generation and evaluating the trained model with (i) a sentence level evaluation to determine percentage of answer sentences predicted out of all answer sentences, and (ii) a token level evaluation performed using a n-gram matching based f-score calculation between a predicted answer and an actual answer.

2. The processor implemented method of claim 1, wherein the method of generating the plurality of answerable questions based on the plurality of contexts corresponding to each of the plurality of sections comprises:

receiving a plurality of templates, a plurality of concepts corresponding to each of the plurality of templates and a plurality of signals corresponding to each of the plurality of templates, wherein the plurality of templates are generated based on Bloom's taxonomy;

obtaining a plurality of atomic concepts corresponding to each of the plurality of templates based on a comparison between each of a plurality of sentences associated with each of the plurality of contexts and a sorted plurality of concepts corresponding to each of the plurality of templates;

obtaining a plurality maximal concepts based on the plurality of atomic concepts and the plurality of signals by identifying at least one of a) a pair of atomic concepts from the plurality of atomic concepts, separated by a signal from the plurality of signals and b) a pair of atomic concepts from the plurality of atomic concepts adjacent to each other; and generating the plurality of answerable questions corresponding to each of the plurality of templates based on the plurality of sentences associated with each of the plurality of contexts, a corresponding plurality of atomic concepts and a corresponding plurality of maximal concepts using a corresponding template matching algorithm.

3. The processor implemented method of claim 2, wherein the plurality of signals are template specific keywords and phrases associated with a specific concept.

4. The processor implemented method of claim 2, wherein the plurality of concepts are obtained from table of contents and index associated with the technical textbook document.

5. The processor implemented method of claim 1, wherein the concept coverage diversity checks whether the generated longform technical question and answer dataset includes concepts from each of the plurality of sections of the technical textbook and, wherein the sentence level precision indicates a percentage of correct answers.

6. A system comprising:

at least one memory storing programmed instructions;

one or more Input/Output (I/O) interfaces; and one or more hardware processors operatively coupled to the at least one memory, wherein the one or more hardware processors are configured by the programmed instructions to:

receive a technical textbook document comprising a plurality of sections;

extract a plurality of contexts associated with each of the plurality of sections using a rule based preprocessing technique, wherein the rule based preprocessing technique removes a plurality of document sentence structures including figures, tables, footnotes and page numbers from the technical textbook document;

generate a first plurality of questions by a neural network machine learning (ML) model, based on the plurality of contexts associated with each of the plurality of sections, wherein randomness in an optimized autoregressive model is excluded by maintaining predefined temperature values, wherein when a temperature value is set to "zero", the optimized autoregressive model generates same set of questions multiple times, wherein when the temperature value is set to "one", the optimized autoregressive model randomly generates varied set of questions every time, wherein the predefined temperature value is "zero" to avoid randomness in question generation;

simultaneously generate a plurality of answerable questions based on the plurality of contexts associated with each of the plurality of sections;

generate a combined plurality of questions by combining the first plurality of questions and the plurality of answerable questions, wherein combining is performed using one of a) concatenation and b) join operation;

generate an answer corresponding to each of the combined plurality of questions, wherein a plurality of sentences associated with a generated answer are one of a) contiguous and b) non-contiguous in the technical textbook document;

compute a mapping score for each of a plurality of answers based on a comparison between each of the plurality of sentences associated with each of the plurality of answers and the corresponding context by comparing each sentence $a_i$ in the generated answer with each sentence $c_j$ in the context and calculating the mapping score $S_{ij}$=match $(a_i, c_j)$, wherein the mapping score $s_{ij}$ depends on a ratio of number of matched tokens and a total number of tokens in an answer sentence;

select a plurality of optimal answers from the plurality of answers based on a corresponding mapping score and a predefined mapping threshold, wherein the plurality of answers having the corresponding mapping score greater than the predefined mapping threshold are selected, wherein when the mapping score $S_{ij}$ is greater than the predefined mapping threshold T, then the $c_j$ is included in a map-backed answer list and marked that it is not considered for matching for subsequent answer sentences, wherein when multiple context sentences $s_{ij}$>T against an answer sentence di, then the context sentence $c_j$ having maximum score is selected in the map-backed answer list, wherein when the map-backed answer list is empty for a question, then that question is not answerable from the context and that question is excluded from question and answer dataset, further achieves (1) map-back the generated answers by the optimized autoregressive model into an extracted answer, and (2) answerability of generated questions by the optimized autoregressive model;

generate a longform technical question and answer dataset based on the combined plurality of questions and an optimal answer corresponding to each of the combined plurality of questions, wherein the generated optimal question and answer dataset based on a plurality of evaluation metrics, wherein the plurality of evaluation metrics comprises the long-formness, a question completeness, a question complexity, a complexity diversity, a concept coverage diversity, and a sentence level precision, wherein the long-formness checks whether each of the plurality of optimal answers comprises at least two sentences, wherein the question completeness checks whether the plurality of answerable questions does not have any unresolved co-reference and indefinite words, wherein the question complexity identifies whether at least one concept is available in each of the plurality of answerable questions, wherein the complexity diversity checks whether the plurality of answerable questions are with varying complexity range comprising easy, medium and hard; and training a model with the generated longform technical question and answer dataset for answer generation and evaluating the trained model with (i) a sentence level evaluation to determine percentage of answer sentences predicted out of all answer sentences, and (ii) a token level evaluation performed using a n-gram matching based f-score calculation between a predicted answer and an actual answer.

7. The system of claim 6, wherein the method of generating the plurality of answerable questions based on the plurality of contexts corresponding to each of the plurality of sections comprises:

receiving a plurality of templates, a plurality of concepts corresponding to each of the plurality of templates and a plurality of signals corresponding to each of the plurality of templates, wherein the plurality of templates are generated based on Bloom's taxonomy;

obtaining a plurality of atomic concepts corresponding to each of the plurality of templates based on a comparison between each of a plurality of sentences associated with each of the plurality of contexts and a sorted plurality of concepts corresponding to each of the plurality of templates;

obtaining a plurality maximal concepts based on the plurality of atomic concepts and the plurality of signals by identifying at least one of a) a pair of atomic concepts from the plurality of atomic concepts, separated by a signal from the plurality of signals and b) a pair of atomic concepts from the plurality of atomic concepts adjacent to each other; and generating the plurality of answerable questions corresponding to each of the plurality of templates based on the plurality of sentences associated with each of the plurality of contexts, a corresponding plurality of atomic concepts and a corresponding plurality of maximal concepts using a corresponding template matching algorithm.

8. The system of claim 7, wherein the plurality of signals are template specific keywords and phrases associated with a specific concept.

9. The system of claim 7, wherein the plurality of concepts are obtained from table of contents and index associated with the technical textbook document.

10. The system of claim 6, wherein the concept coverage diversity checks whether the generated longform technical question and answer dataset includes concepts from each of the plurality of sections of the technical textbook and, wherein the sentence level precision indicates a percentage of correct answers.

11. One or more non-transitory machine-readable information storage mediums comprising one or more instructions which when executed by one or more hardware processors cause:

receiving a technical textbook document comprising a plurality of sections;

extracting a plurality of contexts associated with each of the plurality of sections using a rule based preprocessing technique, wherein the rule based preprocessing technique removes a plurality of document sentence structures including figures, tables, footnotes and page numbers from the technical textbook document;

generating a first plurality of questions by a neural network machine learning (ML) model, based on the plurality of contexts associated with each of the plurality of sections, wherein randomness in an optimized autoregressive model is excluded by maintaining predefined temperature values, wherein when a temperature value is set to "zero", the optimized autoregressive model generates same set of questions multiple times, wherein when the temperature value is set to "one", the optimized autoregressive model randomly generates varied set of questions every time, wherein the predefined temperature value is "zero" to avoid randomness in question generation;

simultaneously generating a plurality of answerable questions based on the plurality of contexts associated with each of the plurality of sections;

generating a combined plurality of questions by combining the first plurality of questions and the plurality of answerable questions, wherein combining is performed using one of a) concatenation and b) join operation;

generating an answer corresponding to each of the combined plurality of questions, wherein a plurality of sentences associated with a generated answer are one of a) contiguous and b) non-contiguous in the technical textbook document;

computing a mapping score for each of a plurality of answers based on a comparison between each of the plurality of sentences associated with each of the plurality of answers and the corresponding context by comparing each sentence $\alpha_i$ in the generated answer with each sentence $c_j$ in the context and calculating the mapping score $s_{ij}$=match $(a_i, C_j)$, wherein the mapping score $s_{ij}$ depends on a ratio of number of matched tokens and a total number of tokens in an answer sentence;

selecting a plurality of optimal answers from the plurality of answers based on a corresponding mapping score and a predefined mapping threshold, wherein the plurality of answers having the corresponding mapping score greater than the predefined mapping threshold are selected, wherein when the mapping score $S_{ij}$ is greater than the predefined mapping threshold T, then the $c_j$ is included in a map-backed answer list and marked that it is not considered for matching for subsequent answer sentences, wherein when multiple context sentences $S_{ij}$>T against an answer sentence $\alpha_i$, then the context sentence $c_j$ having maximum score is selected in the map-backed answer list, wherein when the map-backed answer list is empty for a question, then that question is not answerable from the context and that question is excluded from question and answer dataset, further achieves (1) map-back the generated answers by the optimized autoregressive model into an extracted answer, and (2) answerability of generated questions by the optimized autoregressive model;

generating a longform technical question and answer dataset based on the combined plurality of questions and an optimal answer corresponding to each of the combined plurality of questions, wherein the generated optimal question and answer dataset based on a plurality of evaluation metrics, wherein the plurality of evaluation metrics comprises the long-formness, a question completeness, a question complexity, a complexity diversity, a concept coverage diversity, and a sentence level precision, wherein the long-formness checks whether each of the plurality of optimal answers comprises at least two sentences, wherein the question completeness checks whether the plurality of answerable questions does not have any unresolved co-reference and indefinite words, wherein the question complexity identifies whether at least one concept is available in each of the plurality of answerable questions, wherein the complexity diversity checks whether the plurality of answerable questions are with varying complexity range comprising easy, medium and hard; and training a model with the generated longform technical question and answer dataset for answer generation and evaluating the trained model with (i) a sentence level evaluation to determine percentage of answer sentences predicted out of all answer sentences, and (ii) a token level evaluation performed using a n-gram matching based f-score calculation between a predicted answer and an actual answer.

12. The one or more non-transitory machine-readable information storage mediums of claim 11, wherein the method of generating the plurality of answerable questions based on the plurality of contexts corresponding to each of the plurality of sections:

receiving a plurality of templates, a plurality of concepts corresponding to each of the plurality of templates and a plurality of signals corresponding to each of the plurality of templates, wherein the plurality of templates are generated based on Bloom's taxonomy;

obtaining a plurality of atomic concepts corresponding to each of the plurality of templates based on a comparison between each of a plurality of sentences associated with each of the plurality of contexts and a sorted plurality of concepts corresponding to each of the plurality of templates;

obtaining a plurality maximal concepts based on the plurality of atomic concepts and the plurality of signals by identifying at least one of a) a pair of atomic concepts from the plurality of atomic concepts, separated by a signal from the plurality of signals and b) a pair of atomic concepts from the plurality of atomic concepts adjacent to each other; and generating the plurality of answerable questions corresponding to each of the plurality of templates based on the plurality of sentences associated with each of the plurality of contexts, a corresponding plurality of atomic concepts and a corresponding plurality of maximal concepts using a corresponding template matching algorithm.

13. The one or more non-transitory machine-readable information storage mediums of claim 12, wherein the plurality of signals are template specific keywords and phrases associated with a specific concept.

14. The one or more non-transitory machine-readable information storage mediums of claim 12, wherein the plurality of concepts are obtained from table of contents and index associated with the technical textbook document.

* * * * *